Patented Oct. 9, 1923.

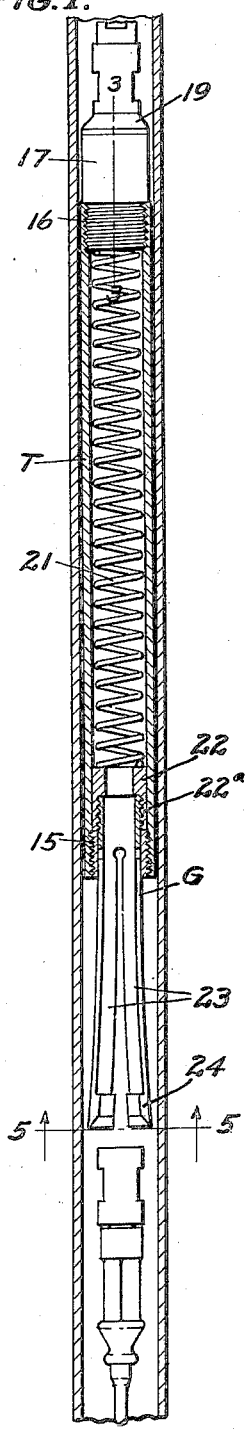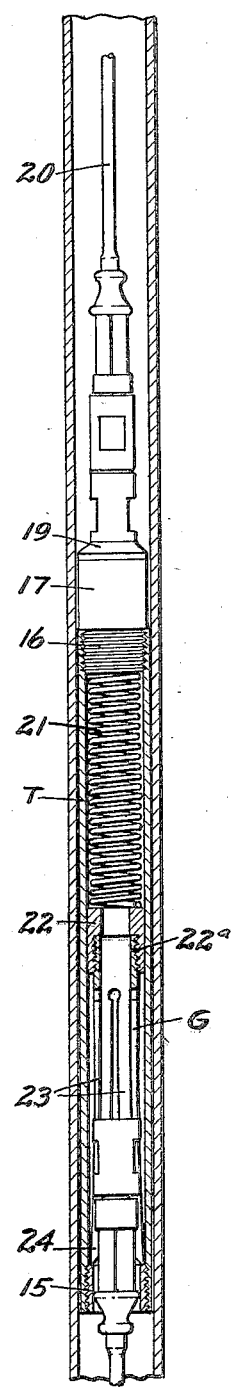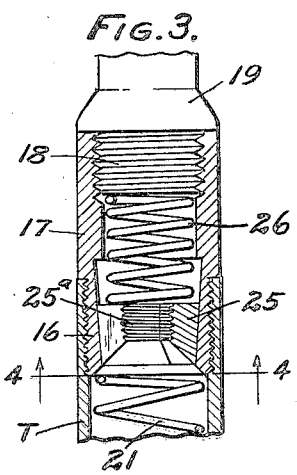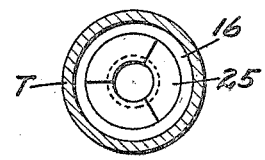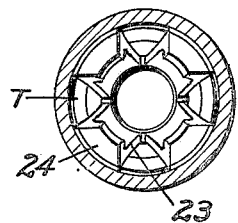

1,470,114

UNITED STATES PATENT OFFICE.

SHANNON A. ERWIN, OF ORCUTT, CALIFORNIA.

SUCKER-ROD OVERSHOT FISHING TOOL.

Application filed November 18, 1921. Serial No. 516,086.

*To all whom it may concern:*

Be it known that I, SHANNON A. ERWIN, a citizen of the United States, residing at Orcutt, in the county of Santa Barbara and State of California, have invented new and useful Improvements in Sucker-Rod Overshot Fishing Tools, of which the following is a specification.

My invention relates to fishing tools for wells, and a purpose of my invention is the provision of a fishing tool of simple, durable and inexpensive construction which is operable to effect the secure gripping of sucker rods and the locking thereof to the tool, so that the broken sucker rod can be readily withdrawn from the well. My invention also provides auxiliary gripping means working in conjunction with the main gripping means for gripping the rod at its smallest diameter, so that should the sucker rod break at this point and thus render the main gripping means ineffective, the auxiliary gripping means will then function.

I will describe one form of fishing tool embodying my invention and will then point out the novel features thereof in claims.

In the accompanying drawings,

Figure 1 is a view showing a portion of a well tubing and the upper or coupling end of a sucker rod with one form of fishing tool embodying my invention arranged within the well tubing and occupying released position, the well tubing and fishing tool being shown in section.

Fig. 2 is a view similar to Fig. 1 with the fishing tool in gripping position with respect to the coupling head of the sucker rod.

Fig. 3 is a sectional view taken on the line 3—3 of Fig. 1.

Figs. 4 and 5 are transverse sectional views taken on the line 4—4 and 5—5, respectively, of Figs. 3 and 1, respectively.

Similar reference characters refer to similar parts in each of the several views.

Referring specifically to the drawings, my invention, in its present embodiment, comprises a tube T interiorly threaded at its opposite ends with the lower threaded portion receiving a locking collar 15. The upper threaded portion receives a bushing 16 of a coupling member 17, the latter in turn receiving a bushing 18 of a connection 19, an actuating rod 20 being connected to the latter. A coil expansible spring 21 is arranged within the tube T with its upper end bearing against the bushing 16 and with its lower end engaging a slip supporting sleeve 22 which is slidably fitted within the tube as shown. The sleeve 22 includes an interiorly threaded bushing 22ᵃ in which the upper end of a gripping member G is adapted to be threaded. As is illustrated to advantage in Fig. 1, the gripping member G comprises the body portion formed of resilient metal which is split longitudinally at intervals to provide a plurality of slips 23 having thickened and beveled free ends 24.

The construction of the gripping members G is such that the slips 23 together with the ends 24 can be contracted so as to be housed in the tube T in the manner shown in Fig. 2.

As shown in Fig. 3, the bore of the bushing 16 as well as a portion of the coupling member 17 is of tapered form and within this bore a plurality of segmental slips 25 are slidably fitted with their inner surfaces roughened as indicated at 25ᵃ for the purpose of effectively gripping a drilling tool rod when the slips are in constricted position. The slips are normally urged to the lower end of the bore to occupy a constricted position by means of a coil expansible spring 26, the spring being of such a tension, however, as to permit of the upward movement of the slips when a sucker rod is inserted therein.

In the operation of the fishing tool, the gripping member G is normally projected from the tube T under the action of the spring 21, as is clearly shown in Fig. 1. When engaging the coupling end of a sucker rod, the fishing tool is lowered so that the ends 24 engage the coupling and expand the slips 23 sufficiently to allow of the gripping member passing over and into embracing position with respect to the coupling, as is clearly shown in Fig. 2. With the gripping member in this applied position, the ends 24 engage one of the shoulders of the coupling and thus provide an operative connection between the coupling and fishing tool for withdrawing the former from the well. The slips of the gripping member are locked in embracing position with respect to the coupling by permitting of a further lowering of the tube T, so that the gripping member passes interiorly of the tube and against the tension of the spring 21. When the gripping member has been completely housed within the tube, the ends 24 engage the upper edge of the locking collar 15 and thereby securely lock the gripping member in embracing position with respect to the coupling.

Should the sucker rod break at any other point than the coupling so as to present a portion to be gripped of much smaller diameter than the coupling, the auxiliary gripping means shown in Fig. 3 can now be brought into use. It will be understood that the sucker rod is inserted between the slips 25 thereby forcing the slips upwardly against the tension of the spring 26 so that they occupy expanded position. However, when the downward pressure upon the fishing tool is relieved, the spring functions to move the slips into constricted position with respect to the sucker rod thereby effectively gripping the same to permit its withdrawal from the well.

Although I have herein shown and described only one form of fishing tool embodying my invention, it is to be understood that various changes and modifications may be made herein without departing from the spirit of the invention and the spirit and scope of the appended claims.

What I claim is:

1. A fishing tool comprising a tube, a supporting sleeve slidably mounted in the tube, a gripping member sustained on said sleeve, said member including a resilient body split to provide a plurality of slips having enlarged and beveled ends, a locking collar in the lower end of the tube, and a spring within the tube and engaging said sleeve for normally urging the gripping member to a projected position with respect to the tube.

2. A fishing tool comprising a tube, a supporting sleeve slidably mounted in the tube, a gripping member sustained on said sleeve, said member including a resilient body split to provide a plurality of slips having enlarged and beveled ends, a locking collar in the lower end of the tube, a spring within the tube and engaging said sleeve for normally urging the gripping member to a projected position with respect to the tube, a bushing in the upper end of the tube having a tapered bore, segmental slips slidably fitted in the bore, and a spring arranged to normally urge the slips to constricted position within the bore.

In testimony whereof I have signed my name to this specification.

SHANNON A. ERWIN.